US012769089B2

(12) United States Patent
Zou et al.

(10) Patent No.: US 12,769,089 B2
(45) Date of Patent: Oct. 20, 2026

(54) OPTICAL LENS AND CAMERA MODULE

(71) Applicant: Lianchuang Electronic Technology Co., Ltd., Nanchang City (CN)

(72) Inventors: Haoren Zou, Nanchang City (CN); Shuang Zhan, Nanchang City (CN); Guodong Liu, Nanchang City (CN); Zhuo Wang, Nanchang City (CN)

(73) Assignee: Lianchuang Electronic Technology Co., Ltd., Nanchang City (CN)

(*) Notice: Subject to any disclaimer, the term of this patent is extended or adjusted under 35 U.S.C. 154(b) by 206 days.

(21) Appl. No.: 18/614,092

(22) Filed: Mar. 22, 2024

(65) Prior Publication Data

US 2024/0319479 A1 Sep. 26, 2024

(30) Foreign Application Priority Data

Mar. 24, 2023 (CN) ......................... 202310297370.5

(51) Int. Cl.
*G02B 9/10* (2006.01)
*G02B 13/00* (2006.01)

(52) U.S. Cl.
CPC ........... *G02B 9/10* (2013.01); *G02B 13/0035* (2013.01); *G02B 13/004* (2013.01)

(58) Field of Classification Search
CPC .... G02B 9/10; G02B 13/0035; G02B 13/004; G02B 13/0045; G02B 13/003
USPC .......................................................... 359/717
See application file for complete search history.

(56) References Cited

U.S. PATENT DOCUMENTS

| | | | | |
|---|---|---|---|---|
| 8,054,564 B1 * | 11/2011 | Kathman | H10F 39/806 | 359/741 |
| 2008/0130143 A1 * | 6/2008 | Oh | G02B 13/003 | 359/794 |
| 2010/0053770 A1 * | 3/2010 | Sato | G02B 9/10 | 359/717 |
| 2011/0013070 A1 * | 1/2011 | Hirao | G02B 13/0085 | 359/708 |
| 2011/0124373 A1 * | 5/2011 | Fukuta | G02B 13/004 | 359/708 |
| 2011/0255856 A1 * | 10/2011 | Reshidko | G02B 13/003 | 359/717 |

(Continued)

*Primary Examiner* — Jia X Pan
(74) *Attorney, Agent, or Firm* — Meunier Carlin & Curfman LLC

(57) ABSTRACT

The present disclosure discloses an optical lens and a camera module, from an object side to an imaging plane along an optical axis, sequentially including: a first group, a second group, and protective glass. The first group has a positive focal power and sequentially includes, from the object side to the imaging plane along the optical axis, a first substrate and a first lens bonded together. The object side surface or image side surface of the first substrate is coated with a stop. The second group has a negative focal power and sequentially includes, from the object side to the image side along the optical axis, a second lens, a second substrate, and a third lens bonded together. The working object distance of the optical lens is from 5 mm to infinity. The optical lens provided by the present disclosure can reduce the size and diameter of the lens while meeting the requirement of a large field of view angle, effectively increase the depth of field, and well satisfy the needs of endoscopic detection range and observation depth.

19 Claims, 12 Drawing Sheets

(56) References Cited

U.S. PATENT DOCUMENTS

2014/0334016 A1* 11/2014 Yin .................... G02B 13/0045
359/716

* cited by examiner

Field curvature

Field curvature

OPTICAL LENS AND CAMERA MODULE

RELATED APPLICATION

This application claims priority to, and the benefit of, Chinese Patent Application No. CN2023102973705, filed on Mar. 24, 2023, which is incorporated by reference herein in its entirety.

TECHNICAL FIELD

The present disclosure relates to the field of optical imaging technology, and, in particular, to an optical lens and camera module.

BACKGROUND

In recent years, with the rapid development of the medical field, the demand for medical equipment in society is also increasing day by day, especially the performance requirements of cameras mounted on medical detection devices are becoming higher and higher. For example, in order to collect images from inside the human body more flexibly and comprehensively, medical devices carrying cameras, such as endoscopes, are generally used to examine various types of intracavitary diseases in the gastrointestinal tract, pancreas, biliary tract, respiratory tract, and so on, so as to determine the internal structure of the human body or observe pathological conditions.

Currently, endoscope lenses on the market generally suffer from problems such as excessive size, small field of view angle, and insufficient depth of field. For instance, the excessive size will cause discomfort to the human body when using an endoscope, the small field of view angle will lead to insufficient observation range of the endoscope lens, and the small depth of field will affect the observation depth of the endoscope lens.

SUMMARY

In view of this, the objective of the present disclosure is to provide an optical lens and camera module, which has at least the characteristics of small size, small diameter, large field of view, and large depth of field.

Embodiments of the present disclosure achieve the above objective through the following technical solutions.

On one hand, the present disclosure provides an optical lens, which, from an object side to an imaging plane along an optical axis, sequentially includes: a first group, a second group, and protective glass. The first group has a positive focal power and sequentially includes, from the object side to the imaging plane along the optical axis, a first substrate and a first lens that are bonded together. An object side surface or image side surface of the first substrate is coated with a stop. The second group has a negative focal power and sequentially includes, from the object side to the image side along the optical axis, a second lens, a second substrate, and a third lens that are bonded together. A working object distance of the optical lens is from 5 mm to infinity. The optical lens satisfies a conditional expression: $0.6\ \text{mm/rad} < TTL/\theta < 1\ \text{mm/rad}$, wherein TTL represents a distance from a object side surface of the first group to the imaging plane on the optical axis, and $\theta$ represents the maximum half field of view angle of the optical lens.

On the other hand, the present disclosure also provides a camera module, including the aforementioned optical lens and an imaging element. The imaging element is used to convert an optical image formed by the optical lens into an electrical signal.

Compared with the prior art, the optical lens provided by the present disclosure adopts two lens groups of substrates and lenses bonded together. By reasonably setting the focal power and surface shape collocation of each lens group, the lens size and diameter are reduced to some extent while ensuring a large field of view angle. This effectively increases the depth of field of the lens, which can well meet the requirements for the detection range and observation depth of endoscopes.

BRIEF DESCRIPTION OF THE DRAWINGS

The above-mentioned and/or additional aspects and advantages of the present disclosure will become apparent and easily understandable from the following description of the embodiments in conjunction with the drawings.

DETAILED DESCRIPTION

Figure 1:
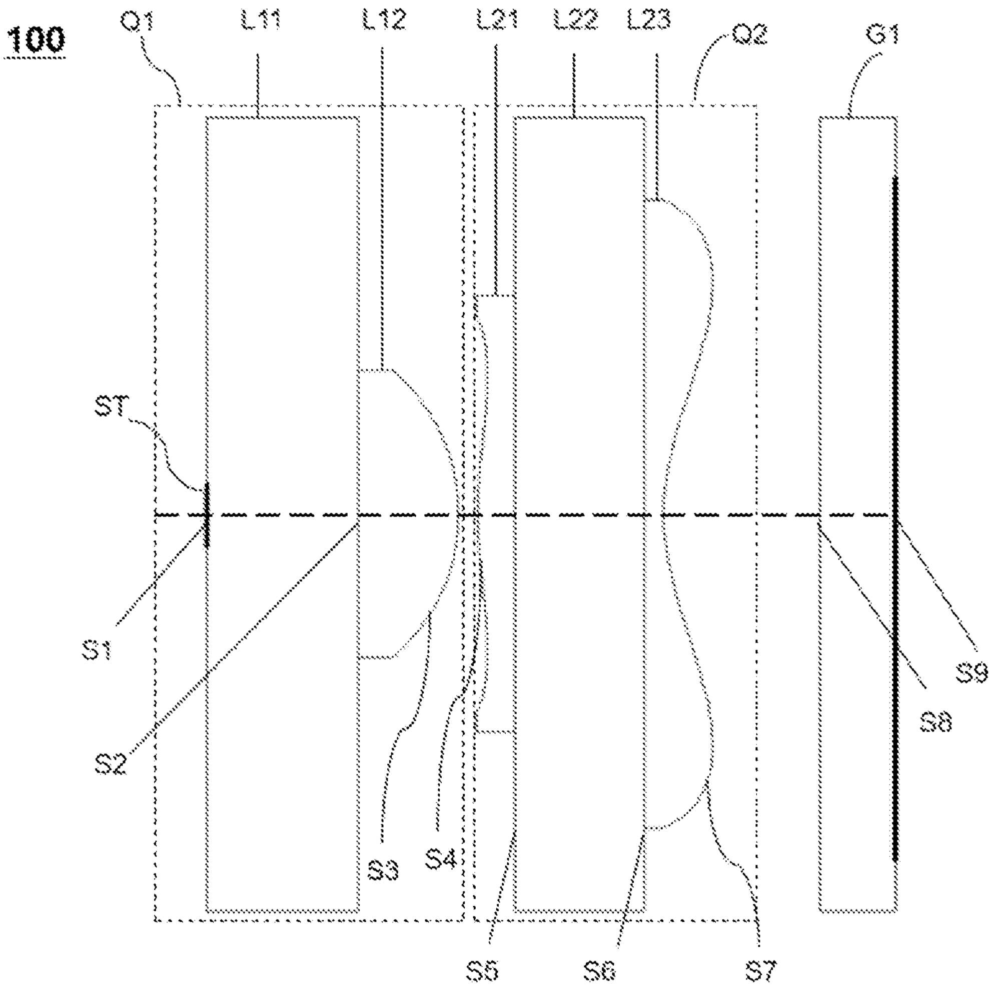
FIG. 1 is a structural schematic diagram of an optical lens in the first embodiment of the present disclosure.

In order to make the objectives, features, and advantages of the present disclosure more apparent and understandable, detailed descriptions of specific embodiments of the present disclosure will be provided below in conjunction with the accompanying drawings. Several embodiments of the present disclosure are depicted in the drawings. However, the present disclosure can be implemented in many different forms and is not limited to the embodiments described herein. Instead, the purpose of providing these embodiments is to make the present disclosure more thorough and comprehensive.

Unless otherwise defined, all technical and scientific terms used herein have the same meanings as those commonly understood by those skilled in the art, to which the present disclosure pertains. The terms used in the specification of the present disclosure are merely intended to describe specific embodiments and are not intended to limit the present disclosure. Throughout the specification, the same reference numerals denote the same elements.

Furthermore, the terms "first," "second," "third," etc., are primarily used to distinguish different devices, components, or constituent parts (which may have the same or different types and structures), and are not intended to indicate or imply the relative importances or numbers of the indicated devices, components, or constituent parts.

Herein, the vicinity of the optical axis refers to a region near the optical axis. For example, if a lens surface is convex and the position of this convex surface is not defined, it implies that at least in the region near the optical axis, the lens surface is convex. If a lens surface is concave and the position of this concave surface is not defined, it implies that at least in the region near the optical axis, the lens surface is concave.

The present disclosure proposes an optical lens, which, from an object side to an imaging plane along an optical axis, sequentially includes: a first group, a second group, and protective glass.

The first group has a positive focal power and sequentially includes, from the object side to the imaging plane along the optical axis, a first substrate and a first lens that are bonded together. The first lens is bonded to the image side surface of the first substrate. In some embodiments, the first group also includes a fourth lens, which is bonded to the object side surface of the first substrate. Lenses are arranged on both surfaces of the first substrate, to ensure high-quality imaging of the lens while making the lens have a larger field of view angle. The bonding surfaces of the first and fourth lenses with the first substrate are flat.

The stop is coated on the object side surface or the image side surface of the first substrate. The stop acts as a hole that limits the size of the incident light beam. Therefore, the size and position of the stop play a decisive role in the clarity, imaging range, and brightness of an image formed by the lens. To better control the intensity of the incident light, the stop is arranged on the object side surface or the image side surface of the first substrate using a film coating method. Since the stop film layer is very thin, it does not affect the bonding effect between the first lens or the fourth lens and the first substrate. To better converge the incident light rays, the effective aperture value of the stop is set relatively small, such as 0.1 mm or 0.15 mm, or other values, depending on the actual situation, and is not specifically limited in this embodiment.

The second group has a negative focal power and sequentially includes, from the object side to the image side along the optical axis, a second lens, a second substrate, and a third lens that are bonded together. The second lens is bonded to the object side surface of the second substrate, and the third lens is bonded to the image side surface of the second substrate. The bonding surfaces of the second lens and the third lens with the second substrate are flat. The first substrate and the second substrate each can be in the form of a glass or plastic substrate with a certain thickness and width. The widths (effective diameters) of the first substrate and the second substrate in a direction perpendicular to the optical axis are greater than the effective diameters of the lenses mentioned above. This provides a stable molding environment for each lens and facilitates the connection and assembly between different groups later on.

More specifically, the thickness of the first substrate and the second substrate can be chosen from 0.1 mm to 0.4 mm. Additionally, the effective diameter of the first substrate and the second substrate is less than 1.5 mm but greater than the effective diameter of each lens, thereby providing better support and stability for each lens.

The aforementioned lenses are connected to the substrates through bonding. Specifically, the first lens, second lens, third lens, and fourth lens can be fixed to the first substrate and the second substrate through methods such as nano-imprinting or etching. This ensures the processing precision and stability of each lens, thereby achieving miniaturization of the optical lens.

The optical lens adopts a processing method of imprinting or etching lens structures on the first substrate and the second substrate (glass or plastic). This method not only achieves wide-angle and miniaturization of the lens but also ensures that the lens has the characteristic of large depth of field. Preferably, the first lens, second lens, third lens, and fourth lens are all processed using photoresist imprinting. The bonding surface between the lens and the substrate is flat, while the surface of the lens away from the substrate can be spherical or non-spherical. A non-spherical lens is preferred as it effectively reduces the manufacturing cost, weight, and provides superior imaging performance with better optical properties.

Due to the small sizes of the lenses of the optical lens provided by the present disclosure and the small overall size thereof, conventional processing of individual lenses and lens assembly is difficult, and processing precision cannot be ensured. Therefore, by bonding the lenses to the first substrate and the second substrate that have large widths, stable support is provided for the positions of the lenses. Additionally, during lens assembly, only the first substrate and the second substrate need to be installed and fixed in the predetermined space, eliminating the need to consider installation errors between multiple lenses. This reduces the overall processing sensitivity.

The working object distance of the optical lens is from 5 mm to infinity, indicating that the lens has a large depth of field range, enabling a significant observation depth.

In some embodiments, the image side surface of the first lens is convex, and the image side surface of the third lens is concave in the vicinity of the optical axis.

In some embodiments, the optical lens satisfies the conditional expression: $0.6\ \text{mm/rad}<TTL/\theta<1\ \text{mm/rad}$, wherein TTL represents a distance from the object side surface of the first group to the imaging plane on the optical axis, and $\theta$ represents the maximum half field of view angle of the optical lens. Meeting the above condition indicates that the optical lens has a relatively small optical total length and a large field of view angle, achieving a balance between small size and large field of view for the lens.

In some embodiments, the optical lens satisfies the conditional expression: $0.06\ \text{mm}<f/F\#<0.1\ \text{mm}$, wherein f represents the effective focal length of the optical lens, and F #represents the aperture value of the optical lens. Meeting the above condition ensures that the optical lens has a sufficiently large depth of field range, enabling clear imaging on the image plane when the object distance ranges from 5 mm to infinity. This is beneficial for increasing the observation depth and detection range of the lens during use.

In some embodiments, the optical lens satisfies the conditional expression: $-1<f_{Q1}/f_{Q2}<-0.05$, wherein $f_{Q1}$ represents the effective focal length of the first group, and $f_{Q2}$ represents the effective focal length of the second group. Meeting the above condition, by properly setting collocation of the positive and negative focal powers of the first and second groups, is advantageous for improving lens performance and imaging quality, controlling the overall length of the lens, and reducing the sensitivity of lens tolerance, which is beneficial for processing.

In some embodiments, the optical lens satisfies the conditional expression: $0.2<f_{Q1}/f<2$, wherein $f_{Q1}$ represents the effective focal length of the first group, and f represents the effective focal length of the optical lens. Meeting the above condition allows the first group to have a reasonable positive focal power, improving the convergence ability of light rays, thereby increasing the field of view angle of the lens and achieving a larger observation range.

In some embodiments, the optical lens satisfies the conditional expression: $f_{Q2}/f<-0.1$, wherein $f_{Q2}$ represents the effective focal length of the second group, and f represents the effective focal length of the optical lens. Meeting the above condition ensures that the second group has an appropriate negative focal power, controlling the angle of incidence of light rays on the image plane to match the CRA (Chief Ray Angle) of the imaging chip, fully utilizing the chip's performance, and thereby improving image quality.

In some embodiments, the optical lens satisfies the conditional expression: $1<D/H<1.3$, wherein D represents the maximum effective diameter of the first substrate and the second substrate, and H represents the full image height of the optical lens. Since the lenses are bonded to the first substrate and the second substrate, and the effective diameter of each lens is smaller than the diameters of the substrates, meeting the above condition ensures that the lens has a relatively small external diameter while increasing the field of view angle and expanding the imaging range, achieving a larger observation range. In some embodiments, the effective diameters of the first substrate, the second substrate, and the protective glass are all equal, which facilitates the processing and assembly of components (including substrates and lenses) of each group into the lens, improving the assembly yield.

In some embodiments, the optical lens satisfies the conditional expression: $0.3\ \text{mm}<CT_{Q1}<0.6\ \text{mm}$, $0.1\ \text{mm}<CT_{Q2}<0.3\ \text{mm}$, where $CT_{Q1}$ represents the center thickness of the first group on the optical axis, and $CT_{Q2}$ represents the center thickness of the second group on the optical axis. Meeting the above condition contributes to achieving lens miniaturization while also benefiting lens molding and assembly, ensuring product yield.

In some embodiments, the optical lens satisfies the conditional expression: $0.8<TTL/D<1$, wherein TTL represents a distance from the object side surface of the first group to the imaging plane on the optical axis, and D represents the maximum effective diameter of the first substrate and the second substrate. Meeting the above condition ensures that the lens has a relatively small optical total length and a small diameter, which is beneficial for achieving miniaturization of the overall size of the lens.

In some embodiments, the optical lens satisfies the conditional expression: $0.25<BFL/TTL<0.4$, wherein BFL represents a distance from the image side surface of the second group to the imaging plane on the optical axis, and TTL represents a distance from the object side surface of the first group to the imaging plane on the optical axis. Meeting the above condition allows for effective control of the overall length of the lens and reduction of lens volume by properly setting the optical back focal length of the lens, thereby achieving lens miniaturization.

In some embodiments, the optical lens satisfies the conditional expression: $0.006\ \text{mm}/^\circ<H/FOV<0.009\ \text{mm}/^\circ$, wherein H represents the full image height of the optical lens, and FOV represents the maximum field of view angle of the optical lens. Meeting the above condition allows for the improvement of the optical lens's edge resolution by controlling distortion, thereby enhancing the imaging quality of the lens.

In some embodiments, the optical lens satisfies the conditional expression: $0.01\ \text{mm}<CT12<0.1\ \text{mm}$, $2<CT1/CT2<10$, wherein CT12 represents an air gap between the first lens and the second lens on the optical axis, CT1 represents the center thickness of the first lens, and CT2 represents the center thickness of the second lens. Meeting the above condition contributes to the miniaturization of the optical lens, facilitating lens molding, and ensuring product yield.

In some embodiments, the maximum field of view angle FOV of the optical lens is ≥115°, and the optical total length TTL of the optical lens is ≤1 mm. The optical lens provided by the present disclosure has a large field of view angle and a small optical total length. When used in a medical device such as an endoscope, it enables the miniaturization of the endoscope lens size while ensuring the widest possible observation range.

The optical lens provided by the present disclosure employs two lens groups of substrates and lenses bonded together, with proper settings of the focal power and surface shape collocation of each lens group, enabling the lens to have a large field of view angle (FOV≥115° while maintaining a small total length (TTL≤1 mm). Additionally, it effectively increases the lens's depth of field, allowing for high-definition imaging within a working object distance range of 5 mm to infinity. This meets the demands for endoscopic inspection range, observation depth, and clarity.

In each embodiment of the present disclosure, when the lens surfaces in the optical lens are non-spherical, the non-spherical surface of each lens satisfies the following equation:

$$z=\frac{ch^2}{1+\sqrt{1-(1+k)c^2h^2}}+\sum A_{2i}h^{2i};$$

wherein z represents a distance vector height from a position at a height of h to the vertex of the non-spherical surface along the optical axis, c denotes the surface's paraxial curvature; k stands for the quadratic surface coefficient; and $A_{2i}$ represents the coefficient of the 2ith order of the non-spherical surface shape.

Further explanation of the present disclosure is provided in multiple embodiments below. In each embodiment, the thickness, curvature radius, and material selection of each lens in the optical lens may vary, as indicated in the parameter tables of each embodiment. The following embodiments represent preferred implementations of the present disclosure, but the implementations of the present disclosure are not limited to these embodiments. Any changes, substitutions, combinations, or simplifications made without departing from the innovative aspects of the present disclosure should be considered equivalent alternative embodiments and are included within the scope of the present disclosure.

First Embodiment

Please refer to FIG. 1, which illustrates a structural schematic diagram of the optical lens 100 provided in the first embodiment of the present disclosure. The optical lens 100 includes, from the object side to the image side along the optical axis, a first group Q1 with a positive focal power, a second group Q2 with a negative focal power, and protective glass G1. In FIG. 1, S1 represents the object side surface of the first substrate L11, S2 represents the bonding surface of the first substrate L11 and the first lens L12, S3 represents the image side surface of the first lens L12, S4 represents the object side surface of the second lens L21, S5 represents the bonding surface of the second lens L21 and the second substrate L22, S6 represents the bonding surface of the second substrate L22 and the third lens L23, S7 represents the image side surface of the third lens L23, S8 represents the object side surface of the protective glass G1, and S9 represents the image side surface of the protective glass G1.

In the embodiment, the first group Q1 sequentially includes the stop ST, the first substrate L11, and the first lens L12 from the object side to the imaging plane along the optical axis. The thickness of the first substrate L11 in the direction of the optical axis is 0.2 mm, and both the object side and image side surfaces of the first substrate L11 are flat. The stop ST is coated on the object side surface of the first substrate L11 using a coating method, with an effective aperture of 0.1 mm. The object side surface of the first lens L12 is flat, while the image side surface thereof is convex. The object side surface of the first lens L12 is bonded to the image side surface of the first substrate L11 using a nano-imprint method.

The relevant parameters of each lens in the optical lens 100 provided in this embodiment are shown in Table 1.

TABLE 1

TTL = 0.905 mm, f = 0.5 mm, FOV = 135°, F# = 5.38

| Surface Number | Name | Curvature Radius (mm) | Thickness (mm) | Refractive Index | Abbe Number | Focal Length (mm) |
|---|---|---|---|---|---|---|
| ST | First | infinity | 0 | | | 0.58 |
| S1 | Group Q1 | infinity | 0.2 | 1.52 | 54.5 | |
| S2 | | infinity | 0.13 | 1.51 | 54.7 | |
| S3 | | −0.3 | 0.025 | | | |
| S4 | Second | 0.5 | 0.05 | 1.51 | 54.7 | −4.96 |
| S5 | Group Q2 | infinity | 0.17 | 1.52 | 54.5 | |
| S6 | | infinity | 0.03 | 1.51 | 54.7 | |
| S7 | | 0.3 | 0.2 | | | |
| S8 | Protective | infinity | 0.1 | 1.517 | 64.2 | |
| S9 | Glass G1 | infinity | — | | | |

The surface shape coefficients of each non-spherical surface in the optical lens 100 of this embodiment are shown in Table 2.

TABLE 2

| Surface Number | k | $A_4$ | $A_6$ | $A_8$ | $A_{10}$ | $A_{12}$ | $A_{14}$ | $A_{16}$ |
|---|---|---|---|---|---|---|---|---|
| S3 | −11.424 | −9.43E+01 | 3.87E+03 | −9.56E+04 | 5.53E+05 | 1.61E+07 | −3.71E+07 | −4.59E+09 |
| S4 | −37.0974 | −1.12E+01 | 3.08E+02 | −6.65E+03 | 1.67E+04 | 8.02E+05 | 1.52E+06 | −1.12E+08 |
| S7 | −1.611 | −1.21E+01 | 6.87E+01 | −2.16E+02 | −8.18E+02 | 5.21E+03 | 1.49E+04 | −1.36E+05 |

The second group Q2 sequentially includes the second lens L21, the second substrate L22, and the third lens L23 from the object side to the imaging plane along the optical axis. The thickness of the second substrate L22 in the direction of the optical axis is 0.17 mm, and both the object side and image side surfaces of the second substrate L22 are flat. The object side surface of the second lens L21 is convex in the vicinity of the optical axis, while the image side surface thereof is flat. The object side surface of the third lens L23 is flat, while the image side surface thereof is concave in the vicinity of the optical axis. The image side surface of the second lens L21 and the object side surface of the third lens L23 are bonded to the object side and image side surfaces of the second substrate L22, respectively, using a nanoimprint method.

The first substrate L11 and the second substrate L22 are both made of glass material, which facilitates the imprinting of lenses and the assembly of lenses.

The image side surface of the first lens L12, the object side surface of the second lens L21, and the image side surface of the third lens L23 are all non-spherical. The first lens L12, the second lens L21, and the third lens L23 are all made of plastic material suitable for production, which not only facilitates the nano-imprinting molding of lenses but also reduces the volumes and weights of the lenses.

Figure 2:
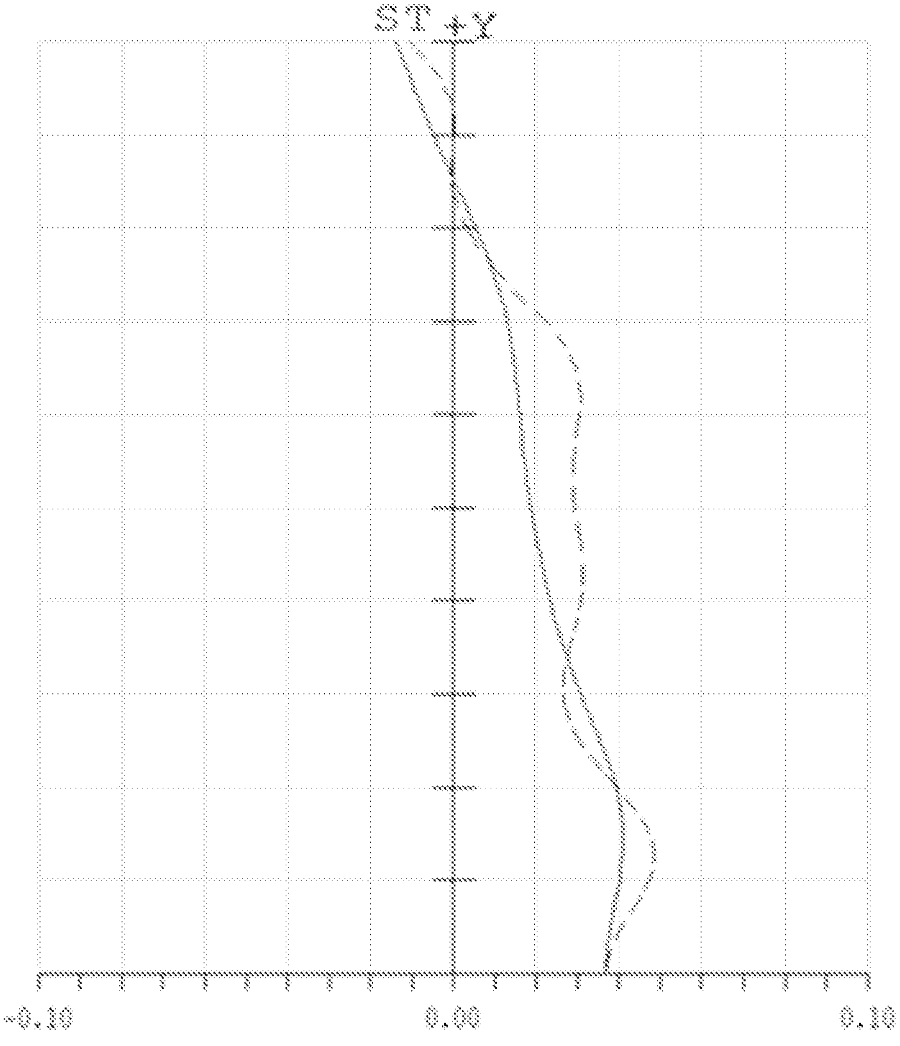
FIG. 2 is a field curvature graph of the optical lens in the first embodiment of the present disclosure.
Figure 3:
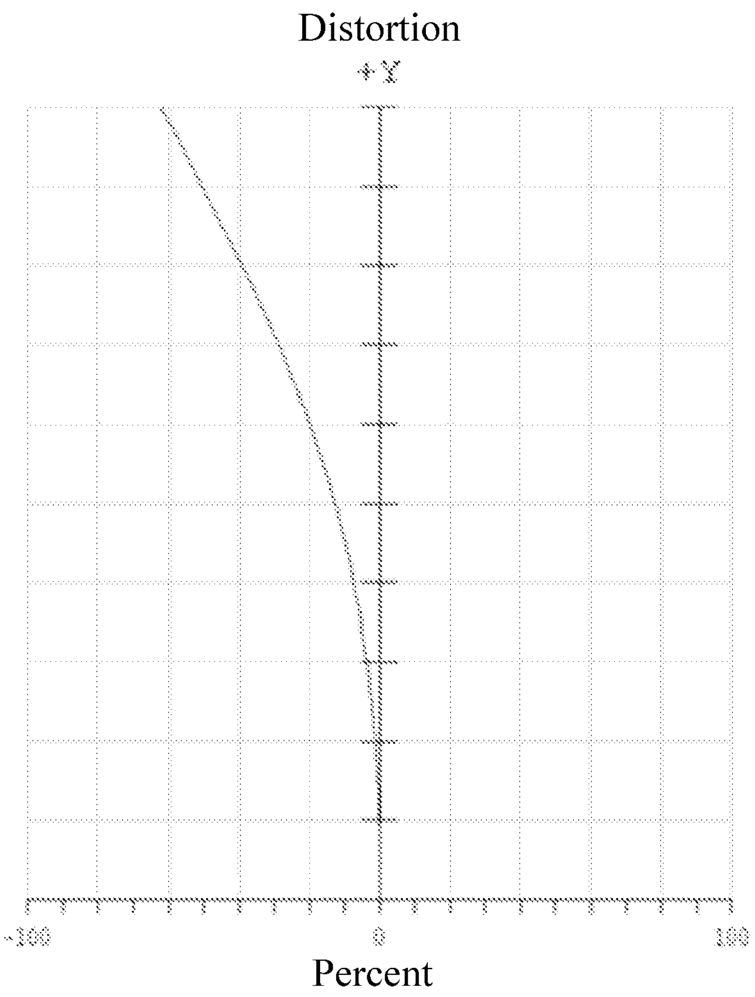
FIG. 3 is a distortion graph of the optical lens in the first embodiment of the present disclosure.
Figure 4:
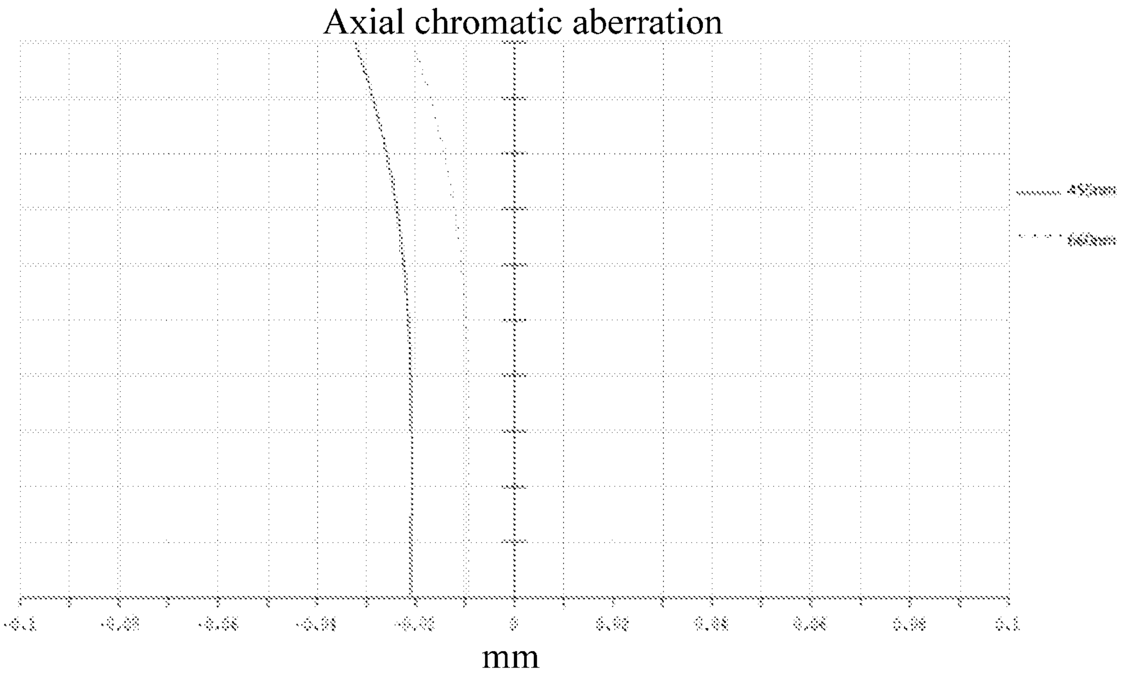
FIG. 4 is an axial chromatic aberration graph of the optical lens in the first embodiment of the present disclosure.

In this embodiment, the graphs of field curvature, distortion, and axial chromatic aberration of the optical lens 100 are shown in FIGS. 2, 3, and 4, respectively.

The field curvature graph in FIG. 2 represents the degrees of curvatures of the meridional image plane and the sagittal image plane. In FIG. 2, the horizontal axis represents the offset (unit: mm), and the vertical axis represents the normalized field of view angle. From FIG. 2, it can be observed that the field curvatures of the meridional image plane and the sagittal image plane are controlled within ±0.05 mm, indicating good correction of the field curvature for the optical lens 100.

The distortion graph in FIG. 3 represents the distortions at different image heights on the imaging plane. In FIG. 3, the horizontal axis represents the percentage of f-θ distortion, and the vertical axis represents the normalized field of view angle. From FIG. 3, it can be seen that the distortion of the optical lens 100 is well corrected.

The axial chromatic aberration graph in FIG. 4 represents the aberrations of different wavelengths on the optical axis at the imaging plane. In FIG. 4, the horizontal axis represents the spherical aberration value (unit: mm), and the vertical axis represents the normalized pupil radius. From FIG. 4, it can be observed that the offset of axial chromatic aberration is controlled within ±0.02 mm, indicating that the optical lens 100 can effectively correct the aberration at the edge of the field of view.

Second Embodiment

Figure 5:
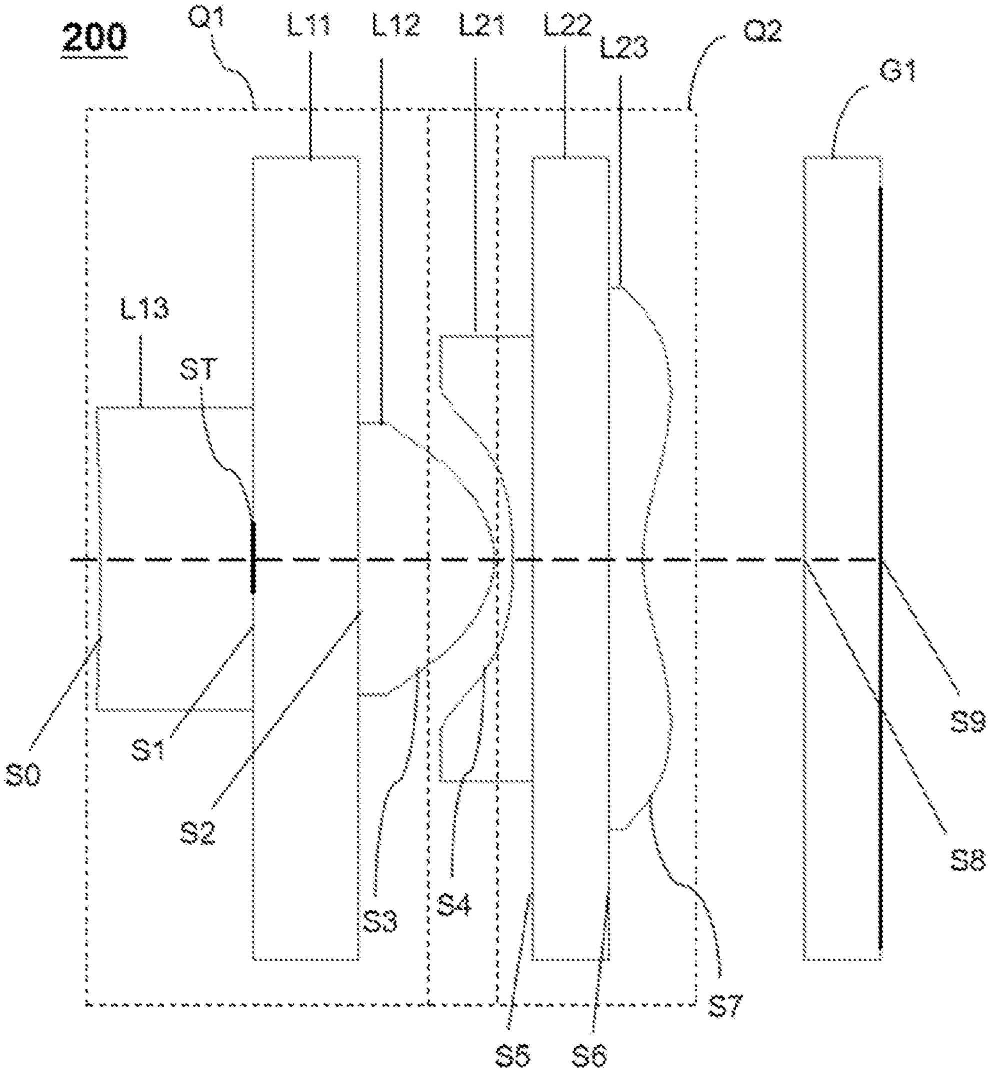
FIG. 5 is a structural schematic diagram of an optical lens in the second embodiment of the present disclosure.

The structural schematic diagram of the optical lens 200 provided in this embodiment can be referred to in FIG. 5. The optical lens 200 in this embodiment is generally similar in structure to the optical lens 100 in the first embodiment. The difference lies in that the first group Q1 in the optical lens 200 also includes the fourth lens L13, which is bonded to the object side surface of the first substrate L11. Specifically, from the object side to the imaging plane along the optical axis, the optical lens 200 sequentially includes: the first group Q1 with a positive focal power, the second group Q2 with a negative focal power, and the protective glass G1. In FIG. 5, S0 represents the object side surface of the fourth lens L13, S1 represents the bonding surface of the fourth lens L13 and the first substrate L11, S2 represents the bonding surface of the first substrate L11 and the first lens L12, S3 represents the image side surface of the first lens L12, S4 represents the object side surface of the second lens L21, S5 represents the bonding surface of the second lens L21 and the second substrate L22, S6 represents the bonding surface of the second substrate L22 and the third lens L23, S7 represents the image side surface of the third lens L23, S8 represents the object side surface of the protective glass G1, and S9 represents the image side surface of the protective glass G1.

The first group Q1, from the object side to the imaging plane along the optical axis, sequentially includes the fourth lens L13, the stop ST, the first substrate L11, and the first lens L12. The thickness of the first substrate L11 in the optical axis direction is 0.13 mm. The stop ST is coated on the object side surface of the first substrate L11 by the coating method, with a thin layer thickness. The effective aperture of the stop is 0.1 mm. Since the coating layer of the stop is very thin, it does not affect the bonding effect between the fourth lens and the first substrate. The object side surface of the fourth lens L13 is concave, and the image side surface of the fourth lens L13 is flat; the object side surface of the first lens L12 is flat, and the image side surface thereof is convex. The image side surface of the fourth lens L13 and the object side surface of the first lens L12 are bonded to the object side surface and the image side surface of the first substrate L11, respectively, by the nanoimprint method.

The second group Q2 sequentially includes the second lens L21, the second substrate L22, and the third lens L23 from the object side to the imaging plane along the optical axis. The thickness of the second substrate L22 in the optical axis direction is 0.1 mm, and both the object side and the image side surfaces of the second substrate L22 are flat. The object side surface of the second lens L21 is concave, and the image side surface thereof is flat; the object side surface of the third lens L23 is flat, while the image side surface thereof is concave in the vicinity of the optical axis. The image side surface of the second lens L21 and the object side surface of the third lens L23 are bonded to the object side and image side surfaces of the second substrate L22, respectively, by the nanoimprint method.

Both the first substrate L11 and the second substrate L22 are made of glass material, which facilitates the imprinting of lenses and the assembly of lenses.

The image side surface of the first lens L12, the object side surface of the second lens L21, the image side surface of the third lens L23, and the object side surface of the fourth lens L13 are all non-spherical. The first lens L12, the second lens L21, the third lens L23, and the fourth lens L13 are all made of plastic material conducive to production, enabling easier manufacturing and reducing the volumes and weights of the lenses.

The relevant parameters of each lens in the optical lens 200 provided in this embodiment are shown in Table 3.

TABLE 3

TTL = 0.995 mm, f = 0.43 mm, FOV = 140°, F# = 5.19

| Surface Number | Name | Curvature Radius (mm) | Thickness (mm) | Refractive Index | Abbe Number | Focal Length (mm) |
|---|---|---|---|---|---|---|
| S0 | First | −1.4 | 0.2 | 1.51 | 54.7 | 0.22 |
| ST | Group Q1 | infinity | 0 | | | |
| S1 | | infinity | 0.13 | 1.52 | 54.5 | |
| S2 | | infinity | 0.18 | 1.51 | 54.7 | |
| S3 | | −0.11 | 0.02 | | | |
| S4 | Second | −0.6 | 0.025 | 1.51 | 54.7 | −0.3 |
| S5 | Group Q2 | infinity | 0.1 | 1.52 | 54.5 | |
| S6 | | infinity | 0.04 | 1.51 | 54.7 | |
| S7 | | 0.22 | 0.2 | | | |
| S8 | Protective | infinity | 0.1 | 1.517 | 64.2 | |
| S9 | Glass G1 | infinity | — | | | |

The surface shape coefficients of each non-spherical surface in the optical lens 200 of this embodiment are shown in Table 4.

TABLE 4

| Surface Number | k | $A_4$ | $A_6$ | $A_8$ | $A_{10}$ | $A_{12}$ | $A_{14}$ | $A_{16}$ |
|---|---|---|---|---|---|---|---|---|
| S0 | −30 | 15 | −4.82E+02 | 5.78E+03 | −3.30E+04 | 9.56E+04 | 2.90E+07 | −5.90E+08 |
| S3 | −4 | −182 | 7.08E+03 | −1.46E+05 | −3.69E+05 | 2.30E+07 | 6.30E+08 | 2.30E+09 |
| S4 | 3.4 | −51 | 7.22E+02 | −8.98E+03 | 1.09E+05 | 1.50E+06 | 6.50E+06 | −3.80E+08 |
| S7 | −6.7 | −12 | 4.60E+01 | 5.30E+01 | −1.45E+03 | −3.05E+03 | −2.25E+04 | 3.70E+05 |

Figure 6:
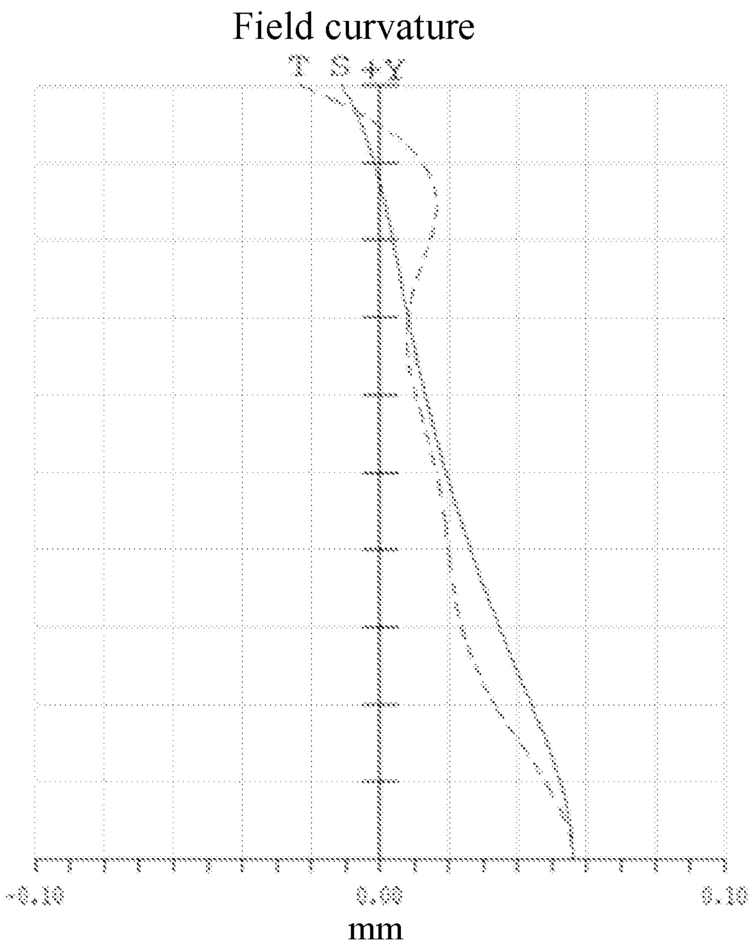
FIG. 6 is a field curvature graph of the optical lens in the second embodiment of the present disclosure.
Figure 7:
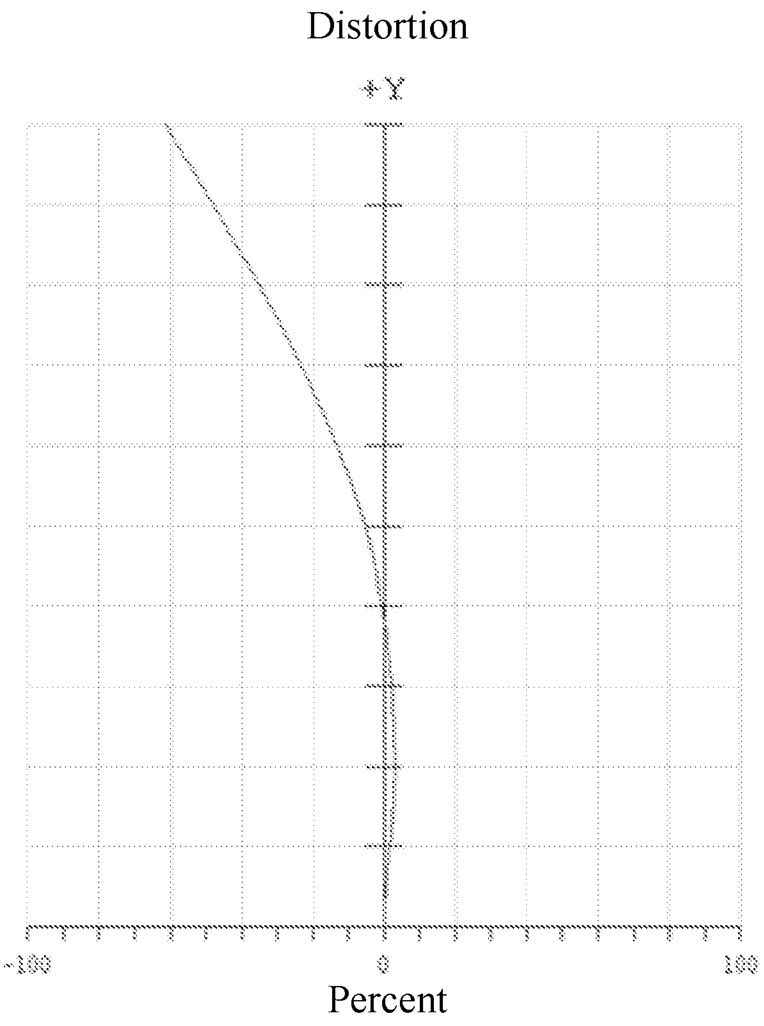
FIG. 7 is a distortion graph of the optical lens in the second embodiment of the present disclosure.
Figure 8:
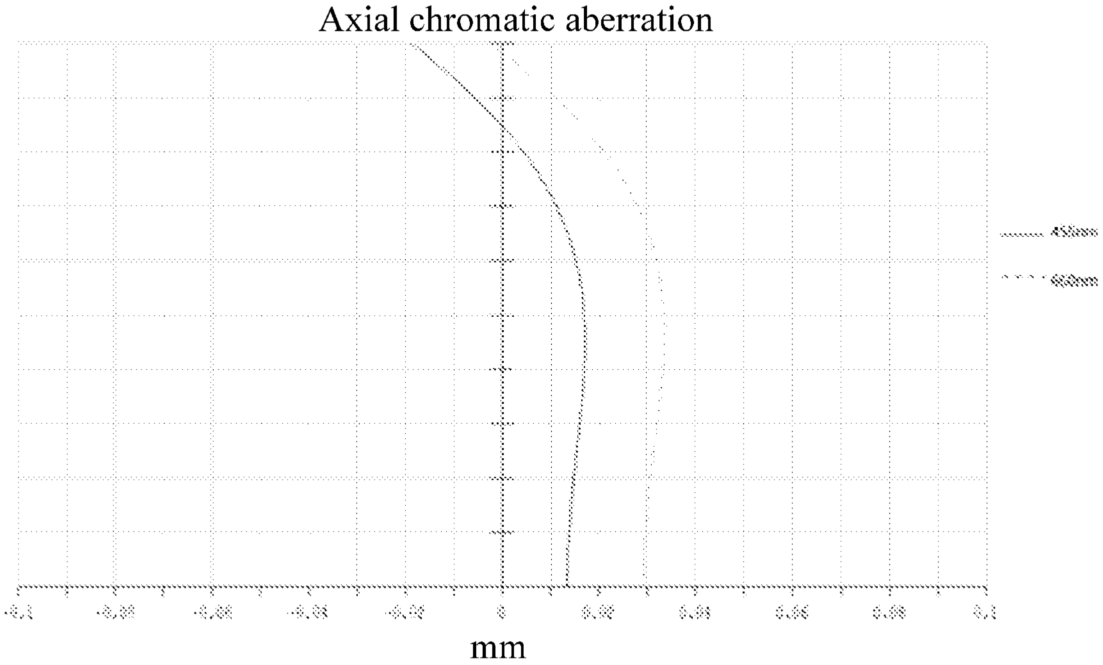
FIG. 8 is an axial chromatic aberration graph of the optical lens in the second embodiment of the present disclosure.

In this embodiment, the graphs of field curvature, distortion, and axial chromatic aberration of the optical lens 200 are shown in FIGS. 6, 7, and 8, respectively.

The field curvature graph in FIG. 6 represents the degrees of curvatures of the meridional image plane and the sagittal image plane. From FIG. 6, it can be seen that the field curvatures of both the meridional and sagittal image planes are controlled within ±0.06 mm, indicating good correction of the field curvature for the optical lens 200.

The distortion graph in FIG. 7 represents the distortions at different image heights on the imaging plane. From FIG. 7, it can be observed that the distortion of the optical lens 200 is well corrected.

The axial chromatic aberration graph in FIG. 8 represents the aberrations of different wavelengths on the optical axis at the imaging plane. From FIG. 8, it can be seen that the offset of axial chromatic aberration is controlled within ±0.02 mm, indicating that the optical lens 200 can effectively correct the aberration at the edge of the field of view.

Third Embodiment

Figure 9:
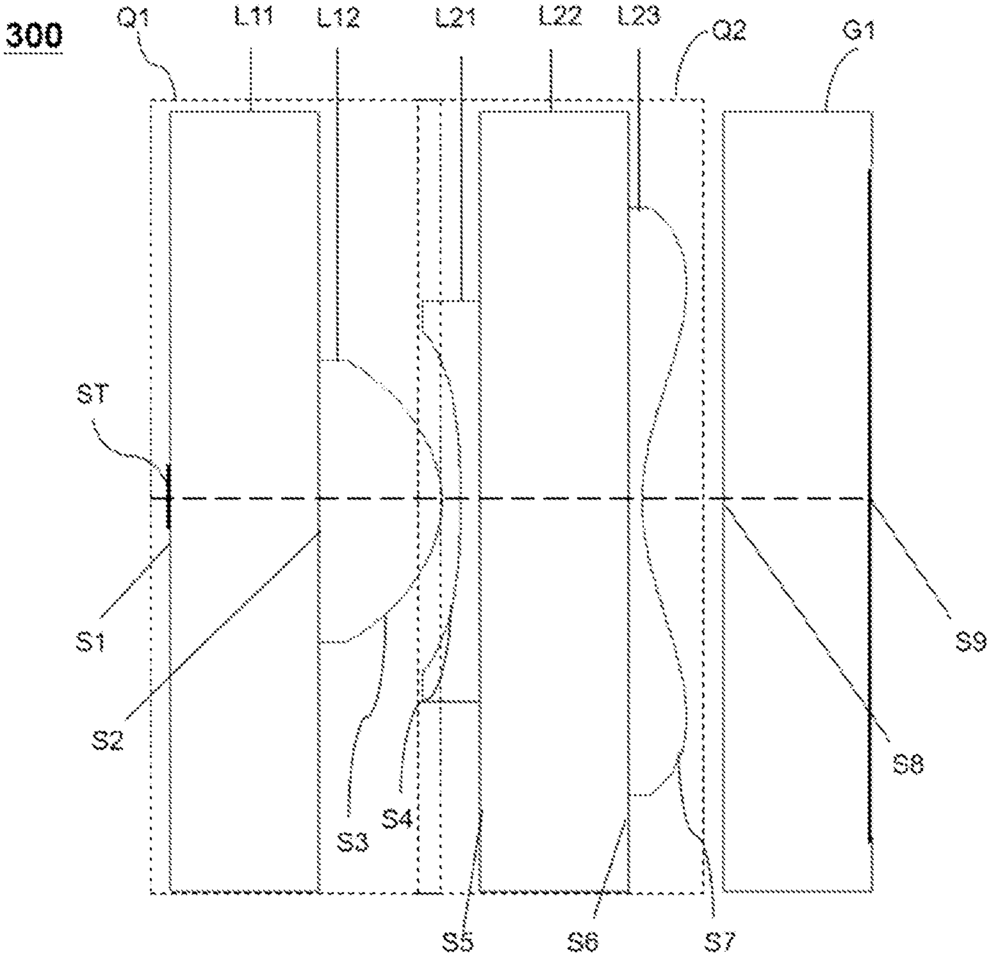
FIG. 9 is a structural schematic diagram of an optical lens in the third embodiment of the present disclosure.

In this embodiment, the structural schematic diagram of the optical lens 300 provided in this embodiment is shown in FIG. 9. The structure of the optical lens 300 in this embodiment is generally similar to that of the optical lens in the first embodiment, with differences mainly in the thickness of the lens glass substrate and the non-spherical surface shape and so on. Specifically, the optical lens 300, from the object side to the imaging plane along the optical axis, sequentially includes: the first group Q1 with a positive focal power, the second group Q2 with a negative focal power, and the protective glass G1. In FIG. 9, S1 represents the object side surface of the first substrate L11, S2 represents the bonding surface of the first substrate L11 and the first lens L12, S3 represents the image side surface of the first lens L12, S4 represents the object side surface of the second lens L21, S5 represents the bonding surface of the second lens L21 and the second substrate L22, S6 represents the bonding surface of the second substrate L22 and the third lens L23, S7 represents the image side surface of the third lens L23, S8 represents the object side surface of the protective glass G1, and S9 represents the image side surface of the protective glass G1.

The first group Q1, from the object side to the imaging plane along the optical axis, sequentially includes the stop ST, the first substrate L11, and the first lens L12. The thickness of the first substrate L11 in the direction of the optical axis is 0.2 mm, and both the object side and image side surfaces of the first substrate L11 are flat. The stop ST is coated on the object side surface of the first substrate L11 through coating, with an effective aperture of 0.1 mm. The object side surface of the first lens L12 is flat, while the image side surface thereof is convex. The object side surface of the first lens L12 is bonded to the image side surface of the first substrate L11 through the nanoimprint method.

The second group Q2, from the object side to the imaging plane along the optical axis, sequentially includes the second lens L21, the second substrate L22, and the third lens L23. The thickness of the second substrate L22 in the direction of the optical axis is 0.2 mm, and both the object side and image side surfaces of the second substrate L22 are flat. The object side surface of the second lens L21 is concave, while the image side surface thereof is flat. The object side surface of the third lens L23 is flat, while the image side surface thereof is concave in the vicinity of the optical axis. The image side surface of the second lens L21 and the object side surface of the third lens L23 are bonded to the object side surface and the image side surface of the second substrate L22, respectively, through the nanoimprint method.

Both the first substrate L11 and the second substrate L22 are made of glass material. The image side surface of the first lens L12, the object side surface of the second lens L21, and the image side surface of the third lens L23 are all non-spherical.

The relevant parameters of each lens in the optical lens 300 provided in this embodiment are shown in Table 5.

TABLE 5

TTL = 0.94 mm, f = 0.46 mm, FOV = 120°, F# = 5.32

| Surface Number | Name | Curvature Radius (mm) | Thickness (mm) | Refractive Index | Abbe Number | Focal Length (mm) |
|---|---|---|---|---|---|---|
| ST | First | infinity | 0 | | | 0.31 |
| S1 | Group Q1 | infinity | 0.2 | 1.52 | 54.5 | |
| S2 | | infinity | 0.17 | 1.51 | 54.7 | |
| S3 | | −0.15 | 0.025 | | | |
| S4 | Second | −1.5 | 0.025 | 1.51 | 54.7 | −0.48 |
| S5 | Group Q2 | infinity | 0.2 | 1.52 | 54.5 | |
| S6 | | infinity | 0.02 | 1.51 | 54.7 | |
| S7 | | 0.3 | 0.1 | | | |
| S8 | Protective | infinity | 0.2 | 1.517 | 64.2 | |
| S9 | Glass G1 | infinity | — | | | |

The surface shape coefficients of each non-spherical surface in the optical lens 300 in this embodiment are shown in Table 6.

TABLE 6

| Surface Number | k | $A_4$ | $A_6$ | $A_8$ | $A_{10}$ | $A_{12}$ | $A_{14}$ | $A_{16}$ |
|---|---|---|---|---|---|---|---|---|
| S3 | −5.60 | −1.15E+02 | 4.35E+03 | −1.01E+05 | 4.46E+05 | 1.43E+07 | 2.40E+06 | −3.10E+09 |
| S4 | 42.85 | −1.26E+01 | 2.71E+02 | −6.73E+03 | 2.45E+04 | 1.00E+06 | 2.91E+06 | −1.16E+08 |
| S7 | −1.80 | −1.23E+01 | 6.82E+01 | −2.09E+02 | −8.17E+02 | 4.18E+03 | 6.42E+03 | −6.69E+03 |

Figure 10:
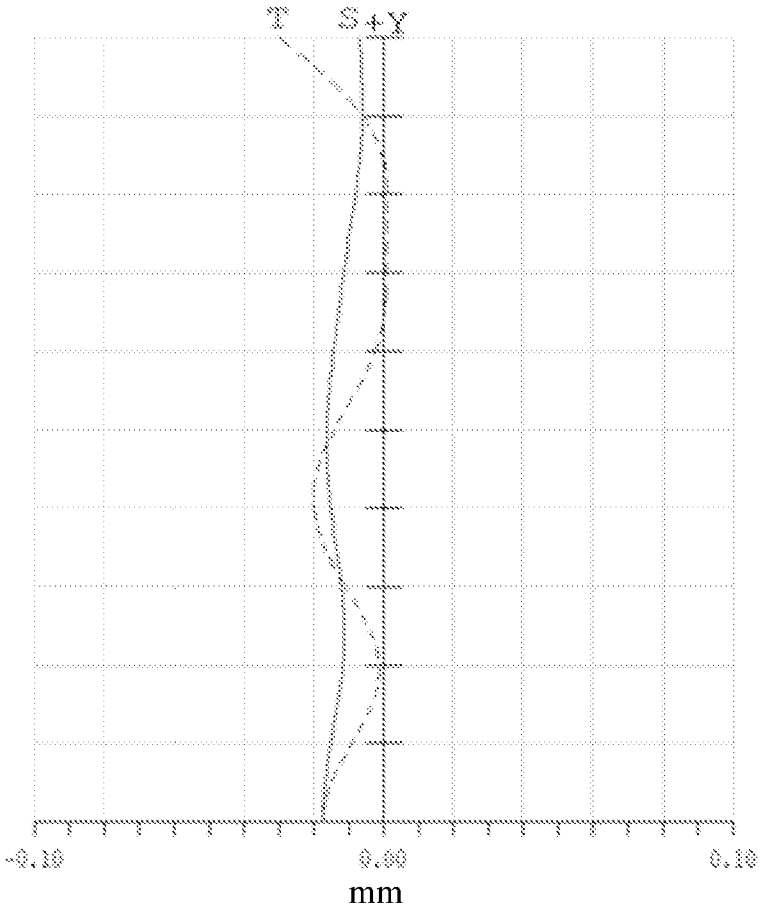
FIG. 10 is a field curvature graph of the optical lens in the third embodiment of the present disclosure.
Figure 11:
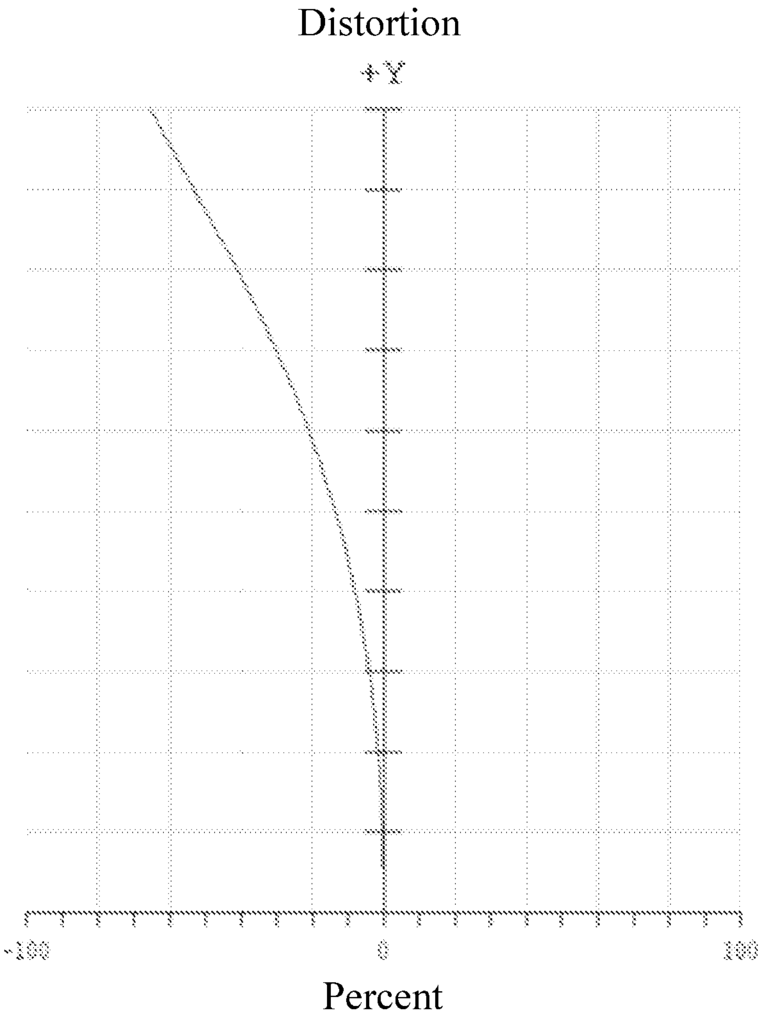
FIG. 11 is a distortion graph of the optical lens in the third embodiment of the present disclosure.
Figure 12:
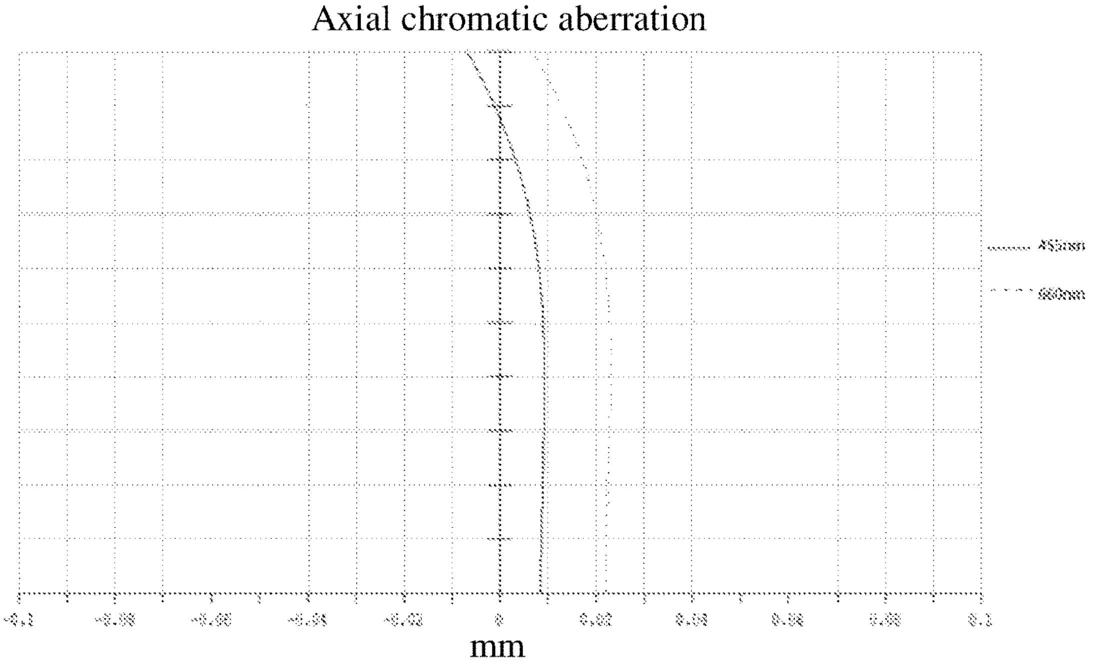
FIG. 12 is an axial chromatic aberration graph of the optical lens in the third embodiment of the present disclosure.

The graphs of field curvature, distortion, and axial chromatic aberration of the optical lens 300 in this embodiment are respectively shown in FIG. 10, FIG. 11, and FIG. 12.

The field curvature graph in FIG. 10 represents the degrees of curvatures of the meridional image plane and the sagittal image plane. From FIG. 10, it can be seen that the field curvatures of both the meridional and sagittal image planes are controlled within ±0.06 mm, indicating good correction of the field curvature for the optical lens 300.

The distortion graph in FIG. 11 illustrates the distortions at different image heights on the imaging plane. It can be seen from FIG. 11 that the distortion of the optical lens 300 is well corrected.

The axial chromatic aberration graph in FIG. 12 represents the aberrations of different wavelengths on the optical axis at the imaging plane. From FIG. 12, it can be seen that the offset of axial chromatic aberration is controlled within ±0.02 mm, indicating that the optical lens 300 can effectively correct the aberration at the edge of the field of view.

Table 7 indicates the optical lens in the 3 embodiments above and the relevant numerical values corresponding to each of the condition.

TABLE 7

| | First embodiment | Second embodiment | Third embodiment |
|---|---|---|---|
| D (mm) | 1.05 | 1.05 | 1.05 |
| H (mm) | 0.95 | 0.95 | 0.95 |

TABLE 7-continued

| | First embodiment | Second embodiment | Third embodiment |
|---|---|---|---|
| TTL/θ (mm/rad) | 0.769 | 0.814 | 0.898 |
| f/F# (mm) | 0.093 | 0.083 | 0.086 |
| $f_{Q1}/f_{Q2}$ | −0.117 | −0.733 | −0.646 |
| $f_{Q1}/f$ | 1.160 | 0.512 | 0.674 |
| $f_{Q2}/f$ | −9.920 | −0.698 | −1.043 |
| D/H | 1.105 | 1.105 | 1.105 |
| $CT_{Q1}$ (mm) | 0.33 | 0.51 | 0.37 |
| $CT_{Q2}$ (mm) | 0.25 | 0.165 | 0.245 |
| TTL/D | 0.862 | 0.948 | 0.895 |
| BFL/TTL | 0.331 | 0.302 | 0.319 |
| H/FOV (mm/°) | 0.007 | 0.007 | 0.008 |
| CT12 (mm) | 0.025 | 0.02 | 0.025 |
| CT1/CT2 | 2.600 | 7.200 | 6.800 |

In summary, the optical lens provided by the present disclosure utilizes two lens groups of substrates and lenses bonded together, with the focal power and surface shape collocation of each lens group reasonably set to achieve a large field of view angle (FOV≥115° while maintaining a small total length (TTL≤1 mm). Additionally, it effectively increases the depth of field, enabling high-definition imaging within a working object distance range from 5 mm to infinity. This meets the requirements for endoscope inspection range, observation depth, and clarity.

Fourth Embodiment

Figure 13:
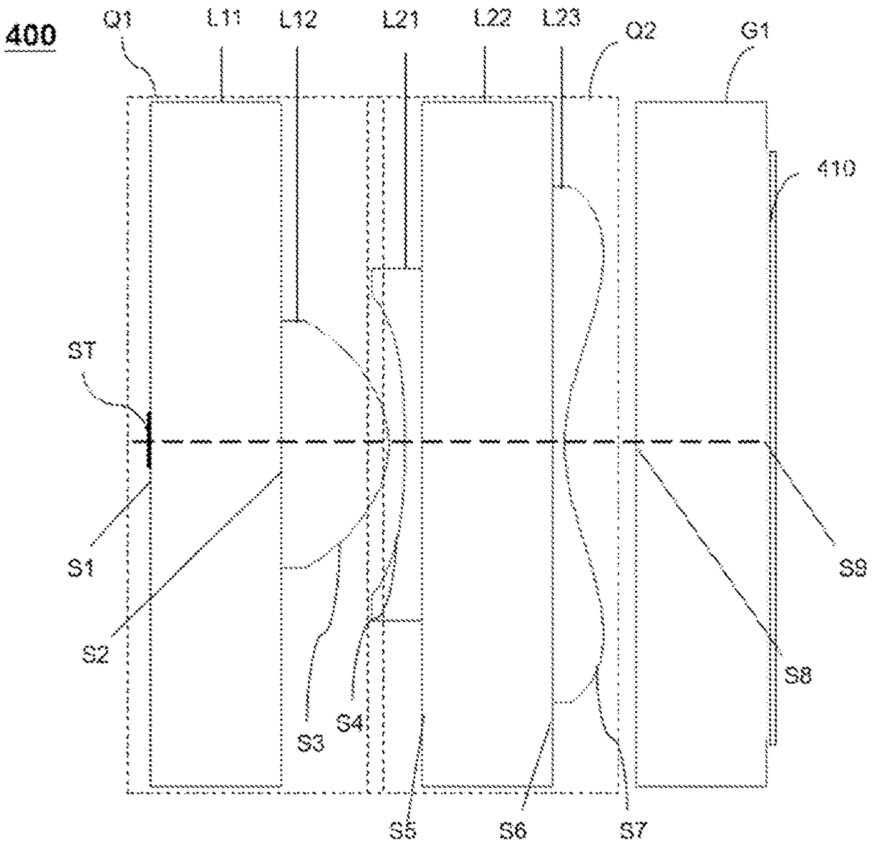
FIG. 13 is a structural schematic diagram of a camera module in the fourth embodiment of the present disclosure.

As shown in FIG. 13, a camera module 400 is provided in the fourth embodiment of the present disclosure. The camera module 400 can include an imaging element 410 and the optical lens 100/200/300 described in any of the previous embodiments (such as the optical lens 100). The imaging element 410 can be a CMOS (Complementary Metal Oxide Semiconductor) image sensor or a CCD (Charge Coupled Device) image sensor.

The camera module 400 can be a medical endoscope, industrial endoscope, capsule lens, or any other form of camera equipped with the optical lens 100.

The camera module 400 provided in this embodiment includes the optical lens described in any of the above embodiments. Due to the characteristics of the optical lens, such as small size, small diameter, and wide field of view, the camera module 400 with this optical lens also has the advantages of small size, small diameter, and wide field of view, which can effectively meet the requirements of endoscope detection range and observation depth.

In the description of this specification, reference terms such as "one embodiment", "some embodiments", "example", "specific example", or "some examples" are intended to mean that specific features, structures, materials, or characteristics described in conjunction with that embodiment or example are included in at least one embodiment or example of the present disclosure. In this specification, the illustrative expressions of the above terms do not necessarily refer to the same embodiment or example. Moreover, specific features, structures, materials, or characteristics described can be appropriately combined in any one or more embodiments or examples.

The embodiments described above only represent several implementations of the present disclosure, which are described in detail but should not be construed as limiting the scope of the present disclosure. It should be noted that for those skilled in the art, various modifications and improvements can be made without departing from the conception of the present disclosure, and these belong to the protection scope of the present disclosure. Therefore, the scope of protection of the patent of the present disclosure shall be subject to the claims annexed hereto.

We claim:

1. An optical lens, from an object side to an imaging plane along an optical axis, sequentially consisting of: a first group, a second group, and protective glass;

the first group has a positive focal power, and the first group sequentially comprises, from the object side to the imaging plane along the optical axis, a first substrate and a first lens bonded together; an object side surface or image side surface of the first substrate is coated with a stop;

the second group has a negative focal power, and the second group sequentially comprises, from the object side to an image side along the optical axis, a second lens, a second substrate, and a third lens bonded together;

wherein a working object distance of the optical lens is from 5 mm to infinity;

the optical lens satisfies a conditional expression: 0.6 mm/rad<TTL/θ<1 mm/rad, where TTL represents a distance from an object side surface of the first group to the imaging plane on the optical axis, and θ represents a maximum half field angle of the optical lens; and wherein an image side surface of the first lens is convex, and an image side surface of the third lens is concave in a vicinity of the optical axis.

2. An optical lens according to claim 1, wherein the first group further comprises a fourth lens bonded to the object side surface of the first substrate.

3. An optical lens according to claim 1, wherein bonding method includes nanoimprint method or etching method, a number of groups with a focal power in the optical lens is two.

4. An optical lens according to claim 1, wherein the optical lens satisfies a conditional expression: $-1<f_{Q1}/f_{Q2}<-0.05$, where $f_{Q1}$ represents an effective focal length of the first group, and $f_{Q2}$ represents an effective focal length of the second group.

5. An optical lens according to claim 1, wherein the optical lens satisfies a conditional expression: 0.06 mm<f/F #<0.1 mm, wherein f represents an effective focal length of the optical lens, and F #represents an aperture value of the optical lens.

6. An optical lens according to claim 1, wherein the optical lens satisfies a conditional expression: $0.2<f_{Q1}/f<2$, where $f_{Q1}$ represents an effective focal length of the first group, and f represents an effective focal length of the optical lens.

7. An optical lens according to claim 1, wherein the optical lens satisfies a conditional expression: $f_{Q2}/f<-0.1$, where $f_{Q2}$ represents an effective focal length of the second group, and f represents an effective focal length of the optical lens.

8. An optical lens according to claim 1, wherein the optical lens satisfies a conditional expression: 1<D/H<1.3, where D represents a maximum effective diameter of the first and second substrates, and H represents a full image height of the optical lens.

9. An optical lens according to claim 1, wherein the optical lens satisfies a conditional expression: 0.3 mm<$CT_{Q1}$<0.6 mm, 0.1 mm<$CT_{Q2}$<0.3 mm, wherein $CT_{Q1}$ represents a center thickness of the first group on the optical axis, and $CT_{Q2}$ represents a center thickness of the second group on the optical axis.

10. An optical lens according to claim 1, wherein the optical lens satisfies a conditional expression: $0.8<TTL/D<1$, where D represents a maximum effective diameter of the first and second substrates.

11. An optical lens according to claim 1, wherein the optical lens satisfies a conditional expression: 0.006 mm/°<H/FOV<0.009 mm/°, wherein H represents a full image height of the optical lens, and FOV represents a maximum field of view angle of the optical lens.

12. An optical lens according to claim 1, wherein the optical lens satisfies a conditional expression: 0.01 mm<CT12<0.1 mm, 2<CT1/CT2<10, wherein CT12 represents an air gap between the first lens and the second lens on the optical axis, CT1 represents a center thickness of the first lens, and CT2 represents a center thickness of the second lens.

13. An optical lens according to claim 1, wherein a maximum field of view angle FOV of the optical lens is ≥115°, and an optical total length TTL of the optical lens is ≤1 mm.

14. A camera module, comprising an optical lens and an imaging element, wherein the imaging element is configured to convert an optical image formed by the optical lens into an electrical signal, the optical lens, from an object side to an imaging plane along an optical axis, sequentially consisting of: a first group, a second group, and protective glass;

the first group has a positive focal power, and the first group sequentially comprises, from the object side to the imaging plane along the optical axis, a first substrate and a first lens bonded together; an object side surface or image side surface of the first substrate is coated with a stop;

the second group has a negative focal power, and the second group sequentially comprises, from the object side to an image side along the optical axis, a second lens, a second substrate, and a third lens bonded together;

wherein a working object distance of the optical lens is from 5 mm to infinity;

the optical lens satisfies a conditional expression: 0.6 mm/rad<TTL/θ<1 mm/rad, where TTL represents a distance from an object side surface of the first group to the imaging plane on the optical axis, and θ represents a maximum half field angle of the optical lens; and wherein an image side surface of the first lens is convex, and an image side surface of the third lens is concave in a vicinity of the optical axis.

15. A camera module according to claim 14, wherein the first group further comprises a fourth lens bonded to the object side surface of the first substrate.

16. A camera module according to claim 14, wherein bonding method includes nanoimprint method or etching method, a number of groups with a focal power in the optical lens is two.

17. A camera module according to claim 14, wherein the optical lens satisfies a conditional expression: $-1<f_{Q1}/f_{Q2}<-0.05$, where $f_{Q1}$ represents an effective focal length of the first group, and $f_{Q2}$ represents an effective focal length of the second group.

18. A camera module according to claim 14, wherein the optical lens satisfies a conditional expression: 0.06 mm<f/F #<0.1 mm, wherein f represents an effective focal length of the optical lens, and F #represents an aperture value of the optical lens.

19. A camera module according to claim 14, wherein the optical lens satisfies a conditional expression: $0.2<f_{Q1}/f<2$, where $f_{Q1}$ represents an effective focal length of the first group, and f represents an effective focal length of the optical lens, wherein the optical lens satisfies a conditional expression: $f_{Q2}/f<-0.1$, where $f_{Q2}$ represents an effective focal length of the second group, and f represents an effective focal length of the optical lens, wherein the optical lens satisfies a conditional expression: $1<D/H<1.3$, where D represents a maximum effective diameter of the first and second substrates, and H represents a full image height of the optical lens, wherein the optical lens satisfies a conditional expression: 0.3 mm<$CT_{Q1}$<0.6 mm, 0.1 mm<$CT_{Q2}$<0.3 mm, wherein $CT_{Q1}$ represents a center thickness of the first group on the optical axis, and $CT_{Q2}$ represents a center thickness of the second group on the optical axis, wherein the optical lens satisfies a conditional expression: $0.8<TTL/D<1$, where D represents a maximum effective diameter of the first and second substrates, wherein the optical lens satisfies a conditional expression: 0.006 mm/°<H/FOV<0.009 mm/°, wherein H represents a full image height of the optical lens, and FOV represents a maximum field of view angle of the optical lens, wherein the optical lens satisfies a conditional expression: 0.01 mm<CT12<0.1 mm, 2<CT1/CT2<10, wherein CT12 represents an air gap between the first lens and the second lens on the optical axis, CT1 represents a center thickness of the first lens, and CT2 represents a center thickness of the second lens, wherein a maximum field of view angle FOV of the optical lens is ≥115°, and an optical total length TTL of the optical lens is ≤1 mm.

* * * * *